(12) United States Patent
Gui et al.

(10) Patent No.: US 11,404,960 B2
(45) Date of Patent: Aug. 2, 2022

(54) CHARGE PUMP GATE DRIVE CIRCUIT FOR REDUCTION IN TURN-ON SWITCHING LOSS FOR MOSFETS

(71) Applicant: University of Tennessee Research Foundation, Knoxville, TN (US)

(72) Inventors: Handong Gui, Knoxville, TN (US); Leon M. Tolbert, Knoxville, TN (US)

(73) Assignee: UNIVERSITY OF TENNESSEE RESEARCH FOUNDATION, Knoxville, TN (US)

(*) Notice: Subject to any disclaimer, the term of this patent is extended or adjusted under 35 U.S.C. 154(b) by 0 days.

(21) Appl. No.: 17/336,684

(22) Filed: Jun. 2, 2021

(65) Prior Publication Data

US 2021/0376721 A1    Dec. 2, 2021

Related U.S. Application Data

(60) Provisional application No. 63/033,539, filed on Jun. 2, 2020.

(51) Int. Cl.
   *H02M 3/07*    (2006.01)

(52) U.S. Cl.
   CPC ............. *H02M 3/077* (2021.05); *H02M 3/07* (2013.01); *H02M 3/071* (2021.05)

(58) Field of Classification Search
   None
   See application file for complete search history.

(56) References Cited

U.S. PATENT DOCUMENTS

| | | | |
|---|---|---|---|
| 6,242,970 B1* | 6/2001 | Grant | H02M 1/08 327/536 |
| 6,531,895 B1* | 3/2003 | Barrett | H03K 17/063 326/82 |
| 6,812,782 B2* | 11/2004 | Grant | H02M 1/08 327/589 |
| 7,388,422 B2* | 6/2008 | Khan | H02M 3/07 327/112 |
| 8,629,663 B2* | 1/2014 | Latham, II | H02M 3/158 323/267 |
| 9,484,758 B2* | 11/2016 | Chen | H02J 7/00 |
| 9,806,607 B2* | 10/2017 | Ranmuthu | H02M 1/32 |
| 10,985,653 B1* | 4/2021 | Cai | H02M 1/0006 |

* cited by examiner

*Primary Examiner* — Jeffery S Zweizig
(74) *Attorney, Agent, or Firm* — Myers Bigel, P.A.

(57) ABSTRACT

An electronic circuit includes a charge pump circuit, which includes a drive power supply; a flying capacitor; and a pump capacitor that is coupled in parallel to the drive power supply and the flying capacitor in response to a first control signal being in first state and is configured to receive charge from the flying capacitor to boost a pump voltage across the pump capacitor to a value that exceeds a drive voltage provided by the drive power supply responsive to a transition of the first control signal from the first state to a second state. The electronic circuit further includes a gate drive circuit coupled to the charge pump circuit.

17 Claims, 10 Drawing Sheets

CHARGE PUMP GATE DRIVE CIRCUIT FOR REDUCTION IN TURN-ON SWITCHING LOSS FOR MOSFETS

CROSS REFERENCE TO RELATED APPLICATION

The present application claims priority to U.S. Provisional Patent Application Ser. No. 63/033,539, filed Jun. 2, 2020, the entire content of which is incorporated by reference herein as if set forth in its entirety.

STATEMENT OF U.S. GOVERNMENT INTEREST

This invention was made with Government support under Grant No. EEC 1041877 awarded by the National Science Foundation. The Government has certain rights in the invention.

FIELD OF THE INVENTION

The present invention relates to power integrated circuit devices and, more particularly, to reduction in turn-on switching loss in power integrated circuit devices.

BACKGROUND

The silicon carbide (SiC) MOSFET is regarded as a promising power semiconductor device for high frequency and high-power applications. Compared with its counterparts like the Si IGBT, the SiC MOSFET has lower specific on-resistance, higher switching speed capability, and higher maximum junction temperature, which may be beneficial for building converters with higher efficiency and power density. Despite the faster switching speed, the switching loss may still be a barrier that prevents or inhibits the adoption of SiC MOSFETs in hard switching converters with a switching frequency of hundreds of kHz. Device datasheets and the reported testing results indicate that the turn-on loss is the dominant part in switching loss.

Gate drive directly controls the switching performance of the power device. Voltage source gate drive (VSG) is the most widely used structure for MOSFETs because of its generally simple structure and low cost. Referring now to FIG. 1, with the constant gate drive output voltage with the VSG, the gate current $i_g$ decreases as the gate voltage $V_{gs}$ rises, and then becomes constant during the Miller plateau. Because of the modest transconductance of SiC MOSFETs shown in FIG. 2, the Miller voltage is high relative to Si devices, which results in low gate current to charge the gate capacitance during the turn-on process. Consequently, the turn-on time is longer, and the switching loss increases.

To increase the switching speed of power devices, the current source gate drive (CSG) has been developed to enhance the gate current during the switching transient. However, these CSG devices generally cannot maintain constant current due to the large voltage drop across the high internal gate resistance of the SiC MOSFET. CSG devices that can keep the current constant throughout the switching transient have been proposed. Nevertheless, these devices may require accurate timing control to turn the gate drive to voltage source after the switching transient so that the gate is not overcharged by the constant gate current, and the bi-directional switches as well as the inductor can make the circuit complicated. In general, CSG is not popular considering the compact, reliable, and low-cost requirements of the gate drives for SiC MOSFETs, especially for discrete devices.

SUMMARY

In some embodiments of the inventive concept, an electronic circuit comprises a charge pump circuit, which comprises a drive power supply; a flying capacitor; and a pump capacitor that is coupled in parallel to the drive power supply and the flying capacitor in response to a first control signal being in first state and is configured to receive charge from the flying capacitor to boost a pump voltage across the pump capacitor to a value that exceeds a drive voltage provided by the drive power supply responsive to a transition of the first control signal from the first state to a second state. The electronic circuit further comprises a gate drive circuit coupled to the charge pump circuit.

In other embodiments, the charge pump circuit further comprises: a first totem pole circuit comprising a first pair of MOSFETs coupled to one another, the first totem pole circuit being coupled in parallel to the drive power supply. The first totem circuit is responsive to the first control signal.

In still other embodiments, the gate drive circuit comprises: a second totem pole circuit comprising a second pair of MOSFETS coupled to one another at an output terminal, the second totem pole circuit being coupled in parallel to the pump capacitor.

In still other embodiments, the second totem pole circuit is configured to couple the pump voltage of the pump capacitor to the output terminal responsive to a transition of a second control signal from the first state to the second state.

In still other embodiments, the electronic circuit further comprises: a control signal generation circuit that is configured to generate the first control signal and the second control signal such that the transition of the second control signal from the first state to the second state is delayed relative to the transition of the first control signal from the first state to the second state.

In still other embodiments, the control signal generation circuit comprises: a first delay module; logic circuitry coupled to the first delay module and configured to generate the first control signal responsive to an input signal and a delayed version of the input signal output from the first delay module; and a second delay module that is configured to generate the second control signal responsive to the input signal.

In still other embodiments, the first delay module comprises at least one first RC filter and the second delay module comprises at least one second RC filter.

In still other embodiments, the pump voltage across the pump capacitor asymptotically approaches the drive voltage provided by the drive power supply responsive to the transition of a second control signal from the first state to the second state.

In still other embodiments, a capacitance $C_p$ of the pump capacitor is not greater than:

$$\frac{C_{gs}(V_{dr} - V_n) + C_{gd\_Q}V_{dc} + C_{oss}V_{dr}}{V_{dr}}$$

wherein $C_{gs}$ is a capacitance of a gate terminal of an SiC MOSFET that is configured for coupling to the output terminal of the second totem pole circuit, wherein $V_{dr}$ is a voltage provided by the drive power supply, wherein $V_n$ is a voltage applied across the gate terminal and a source terminal of the SiC MOSFET, wherein $C_{gd\_Q}$ is a charge equivalent transfer capacitance of the SiC MOSFET at $V_{dc}$, wherein $V_{dc}$ is a DC bus voltage for the SiC MOSFET, and wherein $C_{oss}$ is an output capacitance of one of the MOSFETS of the second totem pole circuit.

In still other embodiments, the electronic device further comprises: a bias power supply that is configured to provide a negative voltage across the gate terminal and the source terminal of the SiC MOSFET while the SiC MOSFET is turned off.

In still other embodiments, a capacitance $C_f$ of the flying capacitor is about 50 times greater than a capacitance $C_p$ of the pump capacitor.

In still other embodiments, the flying capacitor has a capacitance of about 100 nF and the pump capacitor has a capacitance of about 1.8 nF.

In still other embodiments, the gate drive circuit is configured as a voltage source gate drive circuit.

It is noted that aspects described with respect to one embodiment may be incorporated in different embodiments although not specifically described relative thereto. That is, all embodiments and/or features of any embodiments can be combined in any way and/or combination. Moreover, other methods, systems, circuits and/or articles of manufacture according to embodiments of the inventive concept will be or become apparent to one with skill in the art upon review of the following drawings and detailed description. It is intended that all such additional methods, systems, circuits and/or articles of manufacture be included within this description, be within the scope of the present inventive concept, and be protected by the accompanying claims. It is further intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the inventive concept.

DETAILED DESCRIPTION

Figure 1:
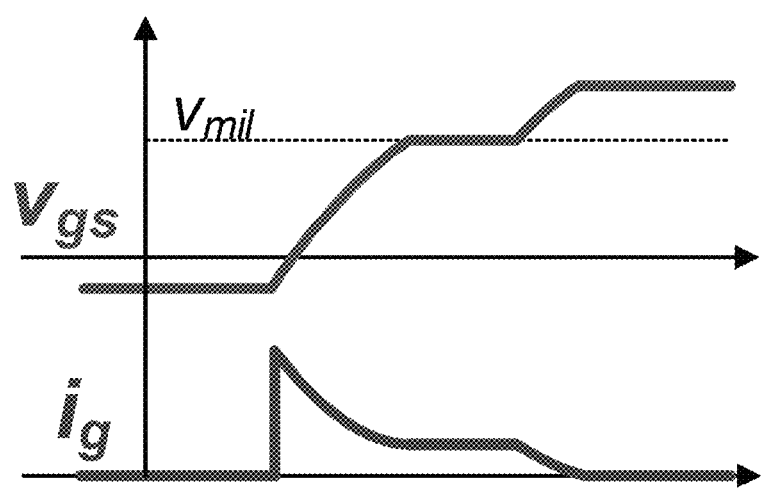
FIG. 1 is a graph of the gate current and gate-source voltage of a power device driven by a voltage source gate drive circuit.
Figure 2:
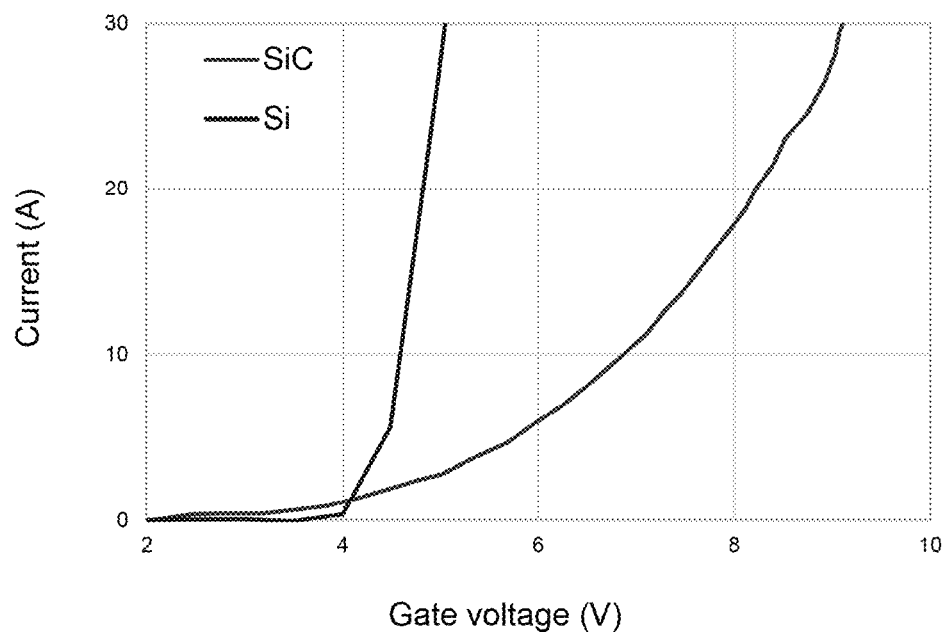
FIG. 2 is a graph that illustrates transconductance characteristics of an Si power device and an SiC power device.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Aspects described with respect to one embodiment may be incorporated in different embodiments although not specifically described relative thereto. That is, all embodiments and/or features of any embodiments can be combined in any way and/or combination. Like numbers refer to like elements throughout the description of the figures.

Embodiments of the inventive concept may provide a charge pump gate drive (CPG) circuit that can reduce the turn-on switching loss of SiC MOSFETs. A CPG circuit, according to some embodiments of the inventive concept, may have a relatively simple structure without the need for additional control components, and sufficient gate current can be provided throughout the turn-on transient of the SiC MOSFET.

As described above, one bottleneck of increasing the turn-on switching speed of SiC MOSFETs is the limited gate current during the switching transient. To address this bottleneck, the impact factors of gate current during the turn-on transient with a typical VSG may be examined with reference to the circuit and graph of FIG. 3.

From the start of turn-on, the gate voltage $V_{gs}$ first increases until the drain current reaches the peak value. During this period, the gate loop is an RC first order network, which consists of external gate resistance $R_{g(ext)}$, internal gate resistance $R_{g(int)}$, and gate capacitance $C_{gs}$. The gate current can be expressed as:

$$i_g(t) = \frac{V_{dr}}{R_{g(ext)} + R_{g(int)}} \exp\left(\frac{t}{(R_{g(ext)} + R_{g(int)})C_{gs}}\right) \quad (1)$$

where $V_{dr}$ is the gate drive supply voltage.

After the drain current approaches its peak, the drain-source voltage starts to drop. Gate current mainly discharges the transfer capacitance, and the gate voltage $V_{gs}$ is clamped to the Miller voltage $V_{mil}$. In this period, the gate current can be regarded as constant:

$$i_g(t) = \frac{V_{dr} - V_{mil}}{R_{g(ext)} + R_{g(int)}} = \frac{V_{dr} - V_{th} - \frac{I_L}{g_m}}{R_{g(ext)} + R_{g(int)}} \quad (2)$$

where $V_{th}$ is the MOSFET gate threshold voltage, $I_L$ is the load current, and $g_m$ is the MOSFET transconductance.

Among the variables in Equations (1) and (2), $I_L$ is determined by application, while $R_{g(int)}$, $C_{gs}$, $V_{th}$ and $g_m$ are intrinsic characteristics of the MOSFET. As a result, the only changeable parameters are gate drive supply voltage $V_{dr}$ and the external gate resistance $R_{g(ext)}$.

By applying a higher gate drive supply voltage (i.e., increasing $v_p$), gate current can be increased. However, the gate voltage rating of SiC MOSFETs is usually around 20 V, which does not leave much margin for increasing the voltage. On the resistance side, reducing external gate resistance also introduces limited improvement because of the relatively large internal gate resistance of SiC MOSFETs, which is normally from 4 to 10Ω. As a result, it may be difficult to increase the switching speed of SiC MOSFETs with a conventional VSG.

Figure 3:
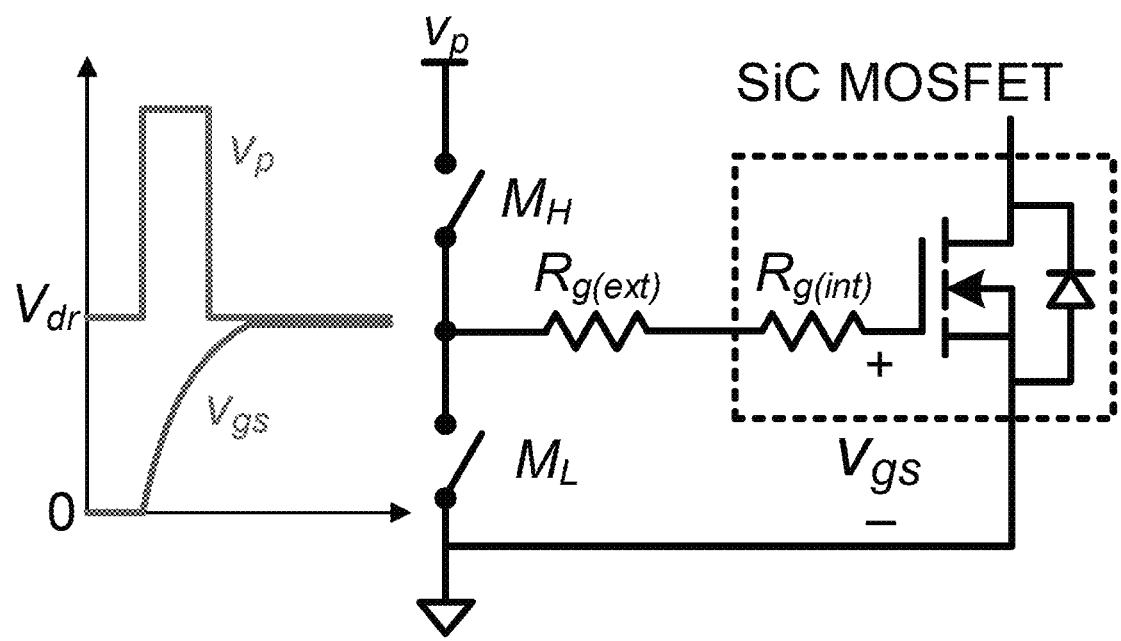
FIG. 3 is a schematic of an ideal gate drive supply voltage circuit.

When considering the switching process, there are two desirable requirements for the gate drive: First, the gate drive may provide sufficient gate current during the switching transient to shrink the switching time. Second, the gate voltage may be kept under the rating of the MOSFET in both transient and steady state. As mentioned above, the gate drive supply voltage cannot be too high mainly due to the second requirement. However, as shown in FIG. 3, the dynamic supply voltage vp can be higher than the gate voltage rating during the switching transient as it takes time for gate voltage $v_{gs}$ to increase. As long as vp drops back to the normal value $V_{dr}$ (lower than the gate voltage rating) before $v_{gs}$ approaches $V_{dr}$, there is no risk of overcharging the gate.

Some gate drive circuits may use four-level gate drives (4LG) to achieve such a function. However, the voltage enhancement during the turn-on transient is still limited by the static gate voltage rating. To further increase the voltage, additional power supplies or transformers are typically required, which significantly increase the complexity and cost of the gate drive. Moreover, the voltage shift requires an accurate control signal to avoid gate overvoltage, which not only increases the complexity of the circuit, but also may not adaptively fit for different load and bus voltage conditions where the switching transient time changes. Therefore, a gate drive circuit according to some embodiments of the inventive concept may have the ability to automatically change the voltage level and guarantee that the gate voltage is always lower than the rating.

Figure 4:
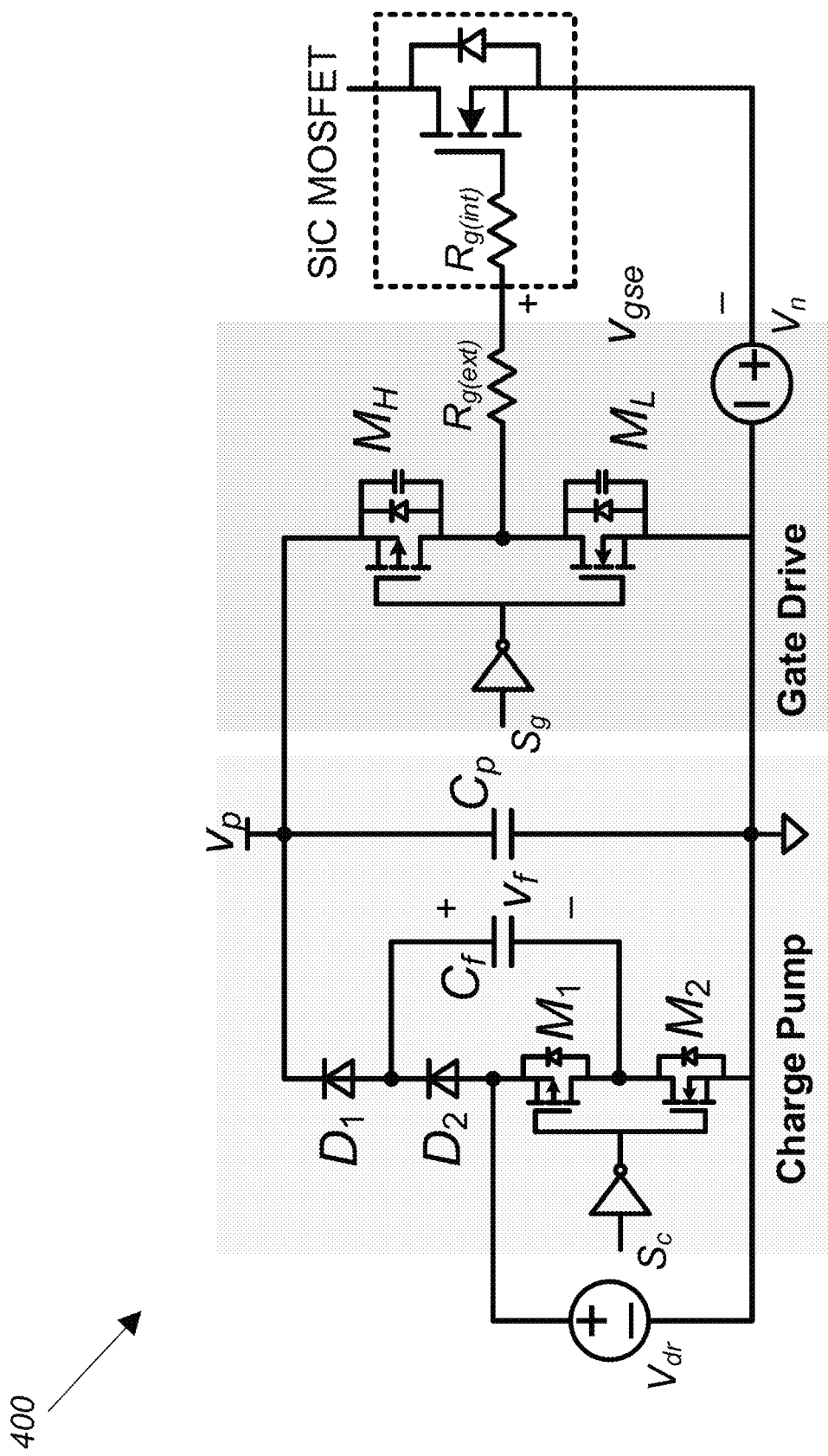
FIG. 4 is a schematic of a charge pump gate drive circuit according to some embodiments of the inventive concept.

Based on the foregoing principles, FIG. 4 illustrates a charge pump gate drive (CPG) circuit 400 according to some embodiments of the inventive concept. It consists of two main parts: a charge pump circuit and a typical voltage source gate drive. The charge pump uses a flying capacitor structure, which consists of a pair of MOSFETs $M_1$ and $M_2$, two diodes $D_1$ and $D_2$, and two capacitors $C_f$ and $C_p$. $C_f$ is the flying capacitor while $C_p$ is the charge-storage capacitor. The VSG circuit is a totem-pole bridge including two MOSFETs $M_H$ and $M_L$. $R_{g(ext)}$ is the external gate resistance, while $R_{g)int)}$ is the internal gate resistance. A voltage $v_p$ is the voltage across $C_p$, which is also the gate drive output voltage when the gate drive is ON. The power supply $V_{dr}$ is connected with $M_1$ and $M_2$. Another power supply Vn provides the required negative voltage across the gate-source during the gate drive OFF state.

Figure 5:
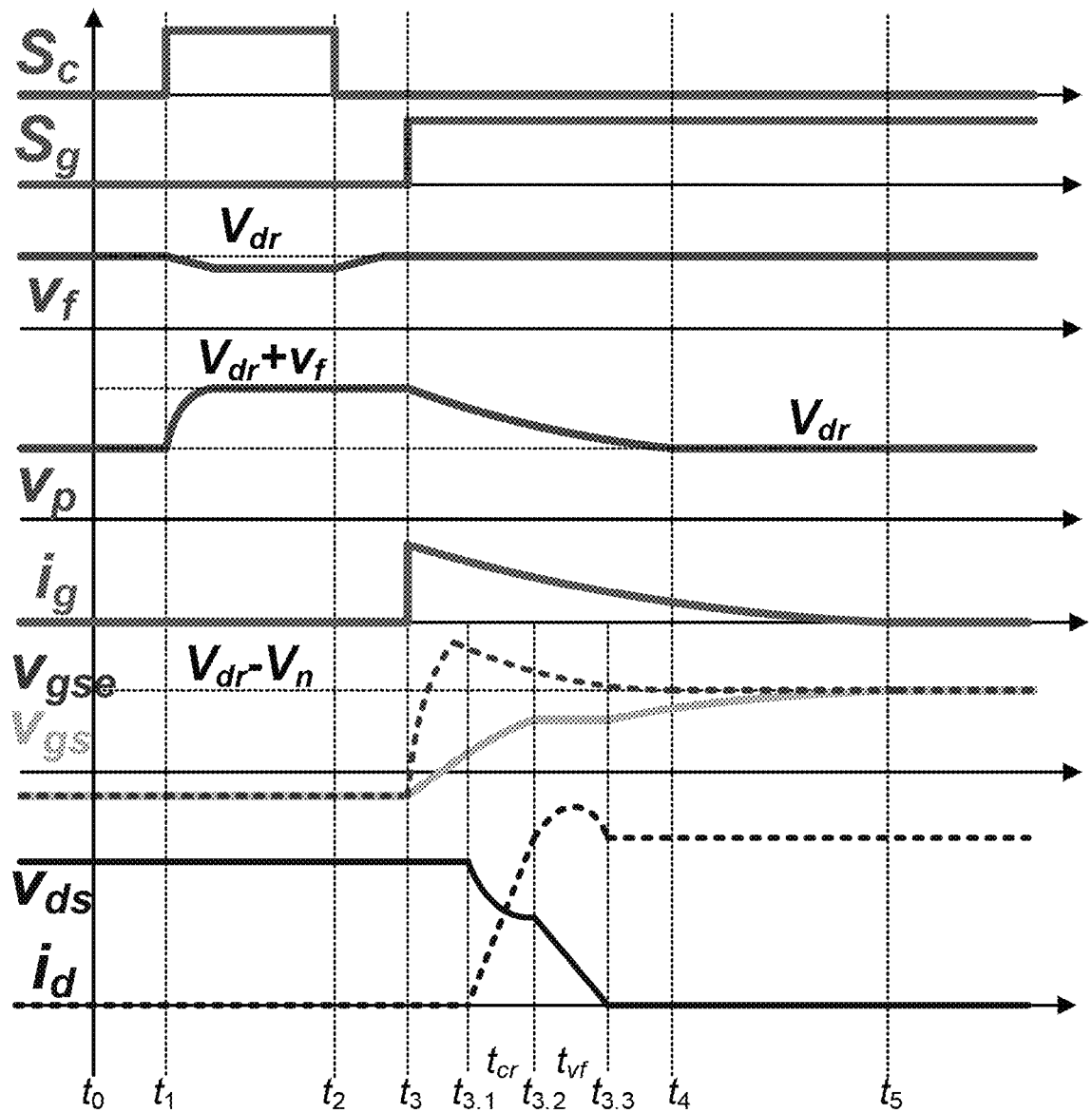
FIG. 5 is a timing diagram that illustrates operations of the charge pump gate drive circuit of FIG. 4 according to some embodiments of the inventive concept.

During one typical turn-on switching period of the CPG circuit 400, there are five modes, and the key waveforms are illustrated in FIG. 5, which includes the charge pump control signal $S_c$, gate drive output control signal $S_g$, the flying capacitor voltage $v_f$, the pump capacitor voltage $v_p$, the gate current $i_g$, and the external and real gate-source voltage $v_{gse}$ and $v_{gs}$. Example operation of the charge pump gate drive circuit during the turn-on transient is described hereafter.

1) Subinterval 1 (t0-t1): OFF steady state. Before $t_1$, both $S_c$ and $S_g$ are in low level, and $M_2$ and $M_L$ are in an ON state. In this state, both $v_f$ and $v_p$ are equal to $V_{dr}$ and do not change if the forward voltage drop of $D_1$ and $D_2$ is neglected. The gate drive output is low to keep the SiC MOSFET in an OFF state. 2) Subinterval 2 ($t_1$-$t_2$): voltage pump state. At $t_1$, $S_c$ changes to high level, and $M_1$ is turned on. As a result, $D_1$ conducts while $D_2$ is off. The flying capacitor $C_f$ transfers energy to the charge-storage capacitor $C_p$. Assuming the energy transfer is lossless, the relationship between $v_p$ and $v_f$ at $t_2$ can be expressed as Equation 3:

$$\begin{cases} V_p(t_2) = v_f(t_2) + V_{dr} \\ C_f v_f^2(t_2) + C_p v_p^2(t_2) = (C_f + C_p)V_{dr}^2 \end{cases} \quad (3)$$

If the capacitance $C_f$ is much higher than $C_p$, the voltage drop on $v_f$ can be neglected, and $v_p(t_2)$ is pumped to $2V_{dr}$. Note that because the energy directly flows from one capacitor to the other, this time period can be relatively short. By the end of this subinterval, the desired or required high supply voltage is established.

3) Subinterval 3 ($t_2$-$t_3$): standby state. At $t_2$, $S_c$ is pulled down to turn on $M_2$ and turn off $M_1$. In such case, $D_1$ is off as $v_p$ is higher than $v_f$. Because part of the energy on $C_f$ is transferred to $C_p$, $D_2$ conducts and the power supply $V_{dr}$ charges $C_f$. In this state, $C_p$ is disconnected from $C_f$, and $v_p$ remains constant at a high voltage level. Note that this subinterval can also be relatively short as long as $D_1$ is off before the gate drive output signal $S_g$ becomes high. The gate drive output is still low, and the SiC MOSFET is in an OFF state.

4) Subinterval 4 ($t_3$-$t_4$): gate-charging state I. At $t_3$, $S_g$ transitions to high, and the gate drive starts to provide current to charge the SiC MOSFET gate capacitance. Because $v_p$ approximately equals to $2V_{dr}$ at the beginning of this state, the gate current can be increased compared with the conventional VSG. The gate voltage $v_{gse}$ starts to increase from $-V_n$, and the SiC MOSFET is turned on when the gate threshold voltage $V_{th}$ is reached.

As $C_p$ is disconnected from $C_f$ and $V_{dr}$, there is no source to provide energy to charge $C_p$. Therefore, $v_p$ keeps decreasing during the charging process, and the gate voltage approaches vp. By tuning the external gate resistance $R_{g(ext)}$, the decreasing rate of $v_p$ can be regulated, which enables changes to the switching speed like a typical VSG.

The CPG circuit 400, according to some embodiments of the inventive concept, may use a pump capacitor $C_p$ having a capacitance that is selected to ensure that $v_p$ can finally reach Vdr. If $C_p$ is too large and has too much stored energy, the steady state vp after the gate charging process can be higher than $V_{dr}$, which may cause overcharging. It should be noted that the external gate-source voltage $v_{gse}$ can be dynamically higher than ($V_{dr}$-$V_n$) because of the internal gate resistance of SiC MOSFETs. However, the real gate-source voltage keeps increasing and does not exceed ($V_{dr}$-$V_n$).

5) Subinterval 5 ($t_4$-$t_5$): gate-charging state II. The voltage $v_p$ reaches $V_{dr}$ at $t_4$, and the gate voltage is still increasing. $D_1$ conducts to connect $C_p$ with $V_{dr}$. Hence, $V_{dr}$ directly provides energy to charge the gate, and the gate drive circuit becomes a typical VSG throughout the rest of the MOSFET ON state. The turn-off process of the CPG circuit 400 is the same as a typical VSG circuit because the turn-off loss is not as large as the turn-on loss. However, the same circuit can also be adopted to reduce the turn-off loss.

Figure 6:
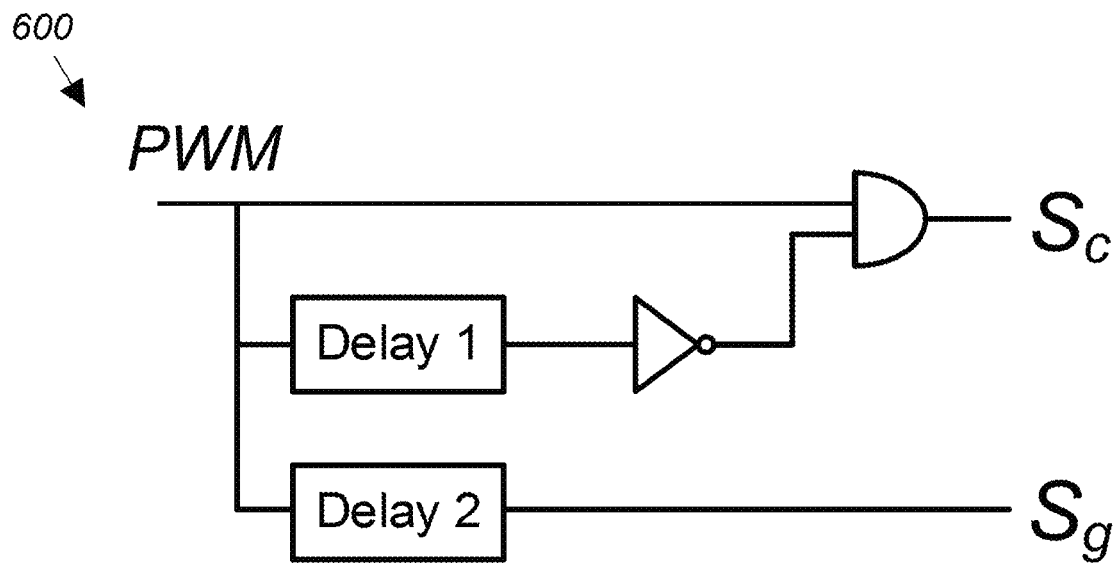
FIG. 6 is a block diagram of a control signal generation circuit according to some embodiments of the inventive concept.
Figure 7:
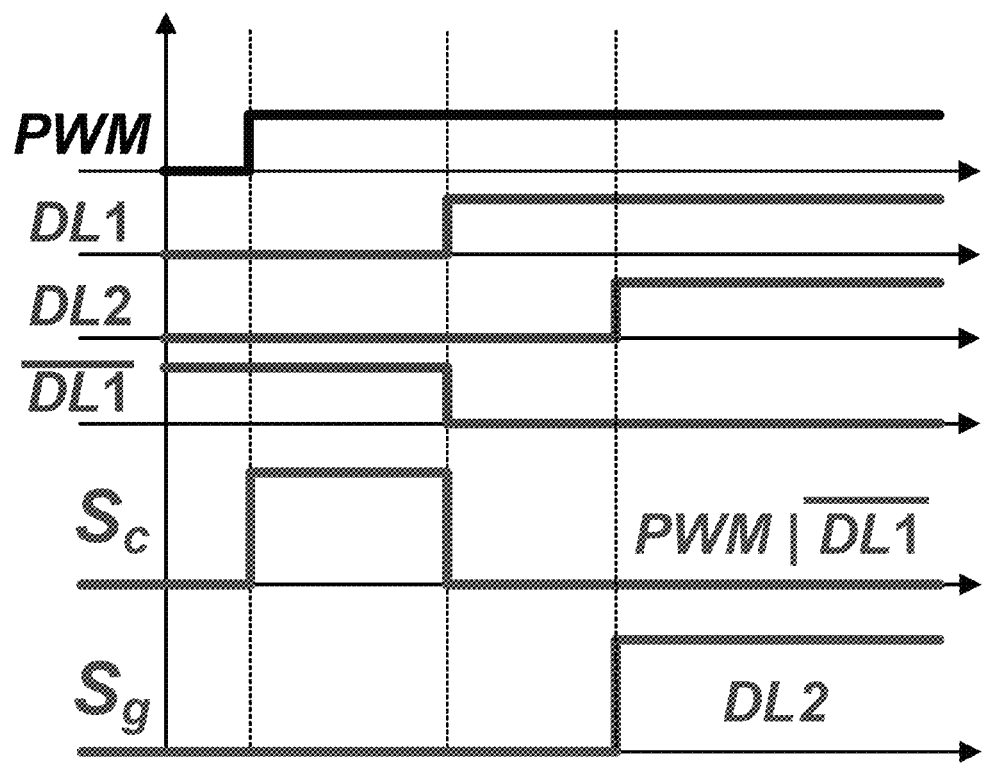
FIG. 7 is a timing diagram that illustrates operations of the control signal generation circuit of FIG. 6 according to some embodiments of the inventive concept.

The CPG circuit 400 only needs two control signals, which can be implemented using one PWM input signal and some logic gates according to some embodiments of the inventive concept. A control signal generation circuit 600, according to some embodiments of the inventive concept, which may be used to control the CPG circuit 400 is shown in FIG. 6. The delay units can be implemented with RC filters with different values. An inverter and an AND gate are used to generate the desired or required signals. Thus, the control signal generation is not complex, and the units can be easily integrated. The logic waveforms of the control signals are illustrated in FIG. 7. As shown in FIG. 7, the PWM input signal transitions to a logic high level and is then subject to two different delays using the Delay 1 and Delay 2 circuits. The Delay 1 and Delay 2 circuits generated output signals DL1 and DL2, respectively, which are delayed versions of the PWM input signal. The output of the Delay 1 circuit is inverted as represented by the DL1 bar signal. The output signal $S_c$ (charge pump control signal) corresponds to the logical AND of the DL1 bar signal and the PWM input signal and the output signal $S_g$ (gate drive output control signal) corresponds to the output of the Delay 2 circuit.

The CPG circuit 400 according to some embodiments of the inventive concept may provide various advantages and benefits including, but not limited to, the following features:
1) the pumped gate drive output voltage may enable a higher gate current that charges the gate capacitance during the turn-on switching transient compared with a conventional VSG. As a result, the turn-on switching loss is reduced.
2) The pumped voltage naturally drops back to a normal gate supply voltage without any additional control, which avoids any overcharging issues and allows for a relatively simple gate drive structure.
3) The CPG circuit 400 is a voltage source based gate drive, and the implementation is similar to a typical VSG for the end-user. The SiC MOSFET turn-on switching speed can be tuned by changing the external gate resistance. Thus, it is relatively convenient to replace a conventional VSG in power converters with the CPG circuit 400 according to some embodiments of the inventive concept.
4) The energy transfer time is relatively short between capacitors, which allows for a generally short charge pump time. Therefore, the time delay between the transition of the PWM signal of FIG. 6 and device turn-on is reduced.
5) No extra power supply is required compared with a conventional VSG, which can reduce cost.
6) No inductor is required, which allows for easier integration of the CPG circuit 400.
7) The control signals of the transistors share the same ground, which avoids complex level shifters or floating drives.

Various design considerations may be evaluated in implementing the CPG circuit 400 according to various embodiments of the inventive concept. These considerations may include, but are not limited to, the following: 1) the drop of the gate drive output voltage is determined by the charge-storage pump capacitor $C_p$. Thus, $C_p$ may be selected based on the gate capacitance $C_{gs}$. If $C_p$ is too large, the pumped voltage cannot decrease to the normal voltage $V_{dr}$, which can introduce overcharging. Otherwise, if $C_p$ is too small, the pumped voltage reduces too quickly during the switching transient, which may detract from the switching speed improvement.

2) The increased turn-on speed results in higher dv/dt, which may lead to significant influence from parasitics. For example, a higher drain-source overvoltage and crosstalk phenomenon can occur on the synchronous device, and EMI can become worse. These side effects from increasing the switching speed may be taken into consideration when implementing the CPG circuit 400.

Figure 8:
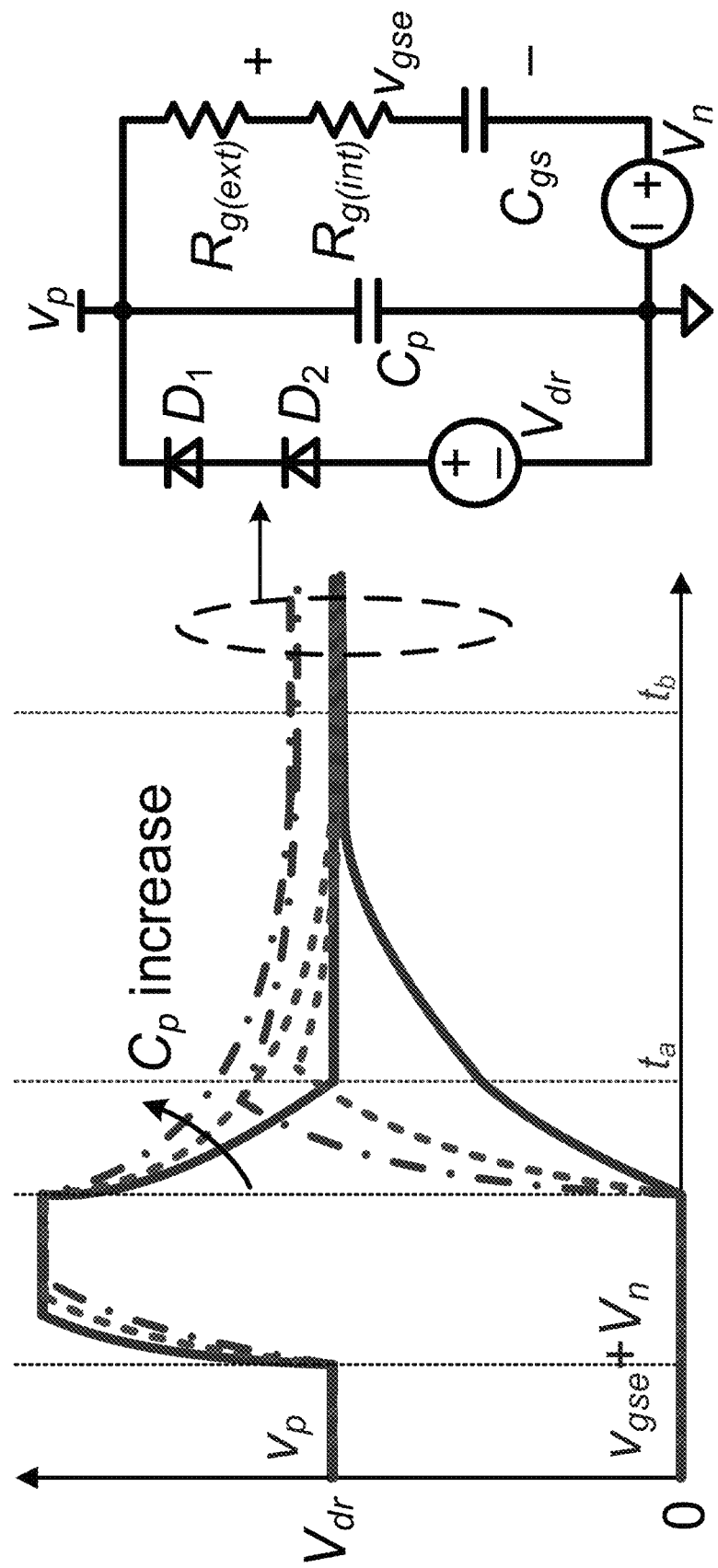
FIG. 8 is a graph that illustrates voltage waveforms turning turn-on of an SiC MOSFET for different values of a charge pump capacitor according to some embodiments of the inventive concept.

As described above, selecting the proper capacitance for the pump capacitor G may be based on the gate capacitance $C_{gs}$. FIG. 8 shows the waveforms of the pumped voltage $v_p$ and the external gate to ground voltage ($v_{gse}$+$V_n$) with different capacitance values for $C_p$. The equivalent circuit after the SiC MOSFET turns on is also plotted. During the turn-on transient, $C_p$ transfers charge to $C_{gs}$. In the end, the voltage across the two capacitances is the same. The main difference is whether $v_p$ can drop to $V_{dr}$ to conduct $D_1$ and $D_2$, and it is determined by the relationship between $C_p$ and $C_{gs}$.

If $C_p$ is too small as shown in FIG. 8, there is not sufficient stored charge for Cgs. As a result, $v_p$ decreases quickly and reaches $V_{dr}$ even when ($v_{gse}$+$V_n$) is still low. Then the required charge is provided by $V_{dr}$, and the gate drive is the same as the conventional VSG. In this case, the switching speed improvement is limited.

On the other hand, an oversized $C_p$ can have severe consequences. As shown in FIG. 8, vp drops slowly as $C_p$ has more stored charge. In the end, ($v_{gse}$+$V_n$) rises higher than $V_{dr}$, which results in overcharging and can cause reliability issues for the gate of the SiC MOSFET.

The ideal case is shown in FIG. 8 where $v_p$ reduces to $V_{dr}$ at the same time when ($v_{gse}$+$V_n$) reaches $v_p$. Under this circumstance, no overcharging occurs, and the switching speed improvement is maximized. Selection of a value for the pump capacitor $C_p$, according to some embodiments of the inventive concept, may be based on Equations 4-7 as described hereafter.

Once $M_H$ is turned on, part of the charge stored in $C_p$ is used to charge the output capacitance of $M_L$, which is represented as $C_{ossL}$. Then the output of the gate drive transitions to a high level, and $C_p$ provides charge to the gate capacitance $C_{gs}$ to turn on the SiC MOSFET. After the drain current of the SiC MOSFET rises to the load current, the gate current discharges the transfer capacitance $C_{gd}$ of the SiC MOSFET and decreases the drain-source voltage. Therefore, if $D_1$ and $D_2$ do not conduct, and $V_{dr}$ does not provide energy to $C_p$, the charge in $C_p$ is transferred to the gate capacitance $C_{gs}$, the transfer capacitance $C_{gd}$ of the SiC MOSFET, and the output capacitance $C_{ossL}$ of $M_L$ as represented by Equation 4:

$$Q_p = Q_{gs} + Q_{gd} + Q_{ossL} \qquad (4)$$

where $Q_p$ is the lost charge in $C_p$, $Q_{gs}$ and $Q_{gd}$ are the gate-source charge and gate-drain charge of the SiC MOSFET, and $Q_{ossL}$ is the charge of $C_{ossL}$ during the turn-on transient.

When the gate voltage goes into steady state, the relationship between $v_p$ and the gate voltage is given by Equation 5:

$$V_p(t_b) = V_{gs}(t_b) + V_n = V_{dr} \quad (5)$$

Therefore, the charge transfer during the turn-on transient is derived as set forth in Equation 6:

$$\begin{cases} V_{p0} - \dfrac{Q_p}{C_p} = \dfrac{Q_{ossL}}{C_{ossL}} = V_n + \dfrac{Q_{gt}}{C_{gs}} = V_{dr} \\ \dfrac{Q_{gd}}{C_{gd\_Q}} = V_{dc} \end{cases} \quad (6)$$

where $V_{p0}$ is the initial voltage of $v_p$, which is approximately $2V_{dr}$. $V_{dc}$ is the DC bus voltage, and $C_{gd\_Q}$ is the charge equivalent transfer capacitance of the SiC MOSFET at $V_{dc}$. Thus, the desired or required $C_p$ can be calculated as set forth in Equation 7:

$$C_p = \dfrac{C_{gs}(V_{dr} - V_n) + C_{gd\_Q} V_{dc} + C_{oss} V_{dr}}{V_{dr}} \quad (7)$$

Note that this is the theoretical maximum capacitance for $C_p$ that can be used to avoid overcharging. To leave some margin, the selected capacitance for $C_p$ may be a little lower than the calculated value from (7).

In terms of $C_f$, as mentioned above, it may have a capacitance that is much higher than the capacitance of $C_p$. In some embodiments, the capacitance value for $C_f$ that is about 50 times higher than the capacitance of $C_p$.

Embodiments of the inventive concept may be illustrated by way of example. A SiC MOSFET using state-of-the-art die technology has been used to test the CPG circuit 400. The characteristics of the MOSFET and the parameters of the implemented CPG circuit are listed in Table I and Table II, respectively. To compare the switching performance, a conventional VSG with the same $V_{dr}$ and $V_n$ is also tested. The applied DC bus voltage is 500 V, while the peak load current is 30 A.

TABLE I

Characteristics of SiC MOSFET

| Device | Packaging | Voltage | Current | $R_{g(int)}$ | $C_{gs}$ |
|---|---|---|---|---|---|
| C3M0075120K | TO-247 4pin | 1.2 kV | 30 A | 10.5 Ω | 1.4 nF |

TABLE II

Parameters of gate drive.

| $M_1$, $M_2$ | SI4599<br>P and N channel<br>MOSFETs, Vishay,<br>40 V, 5 A | $M_H$, $M_L$ | SI4559<br>P and N channel<br>MOSFETs, Vishay,<br>60 V, 4 A |
|---|---|---|---|
| $D_1$, $D_2$ | SS24<br>Schottky diode, ONSemi<br>40 V, 2 A | $C_p$<br>$C_f$ | 1.8 nF<br>100 nF |

Figure 9:
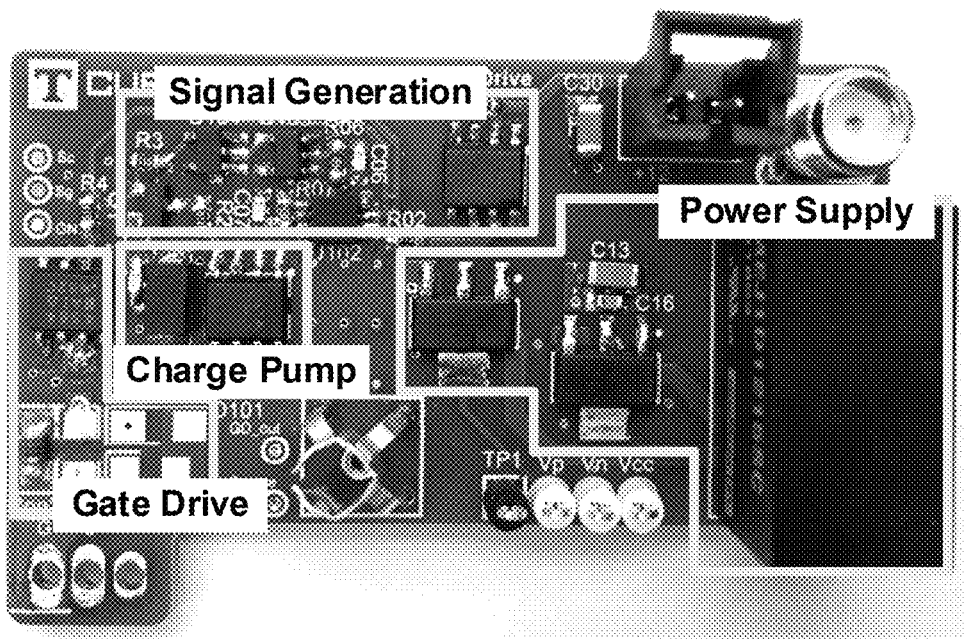
FIG. 9 is a diagram of a prototype of a charge pump gate drive circuit according to some embodiments of the inventive concept.
Figure 10:
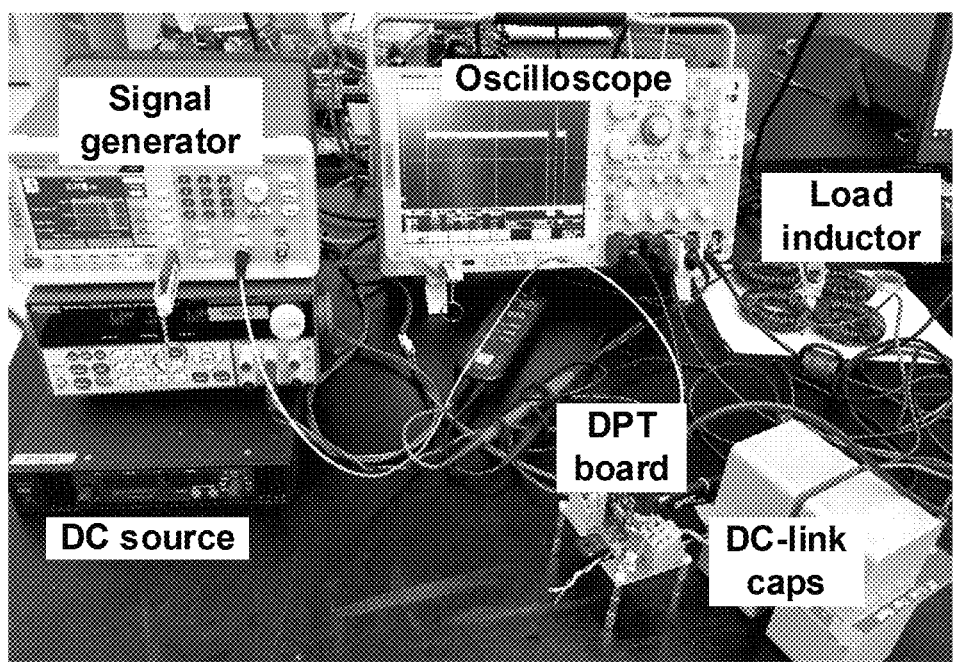
FIG. 10 is a diagram of a testing platform of an implementation of a charge pump gate drive circuit according to some embodiments of the inventive concept.

The prototype of the example CPG circuit, according to some embodiments of the inventive concept, is shown in FIG. 9. Note that the charge pump part only accounts for a small portion of the PCB. FIG. 10 illustrates the testing platform of the double pulse test (DPT) to verify the switching operation of the gate drives.

Figure 11:
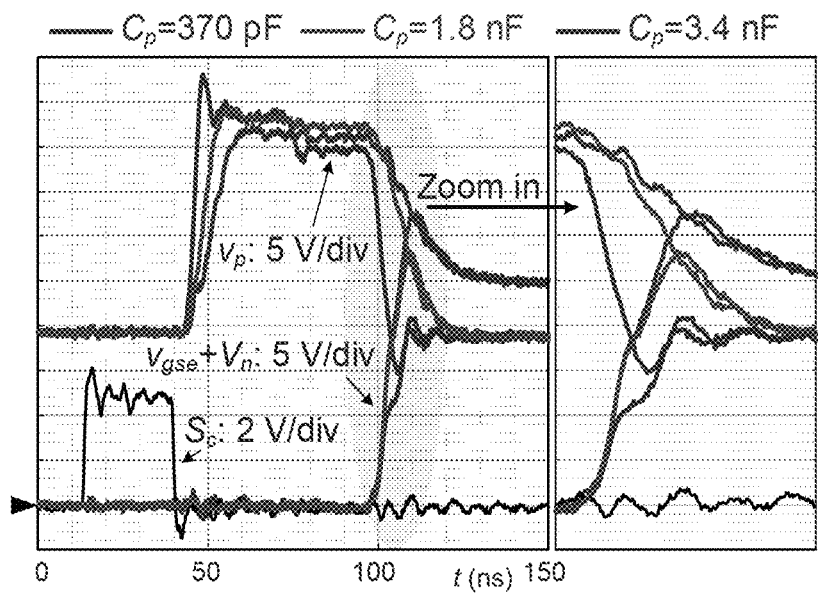
FIG. 11 is a diagram that illustrates different voltages across the pump capacitor for different capacitance values.

The basic charge pump function of the example CPG circuit, according to some embodiments of the inventive concept, is evaluated first. Based on the calculation from Equation 7, $C_p$ should be 1.7 nF for the tested SiC MOSFET. FIG. 11 shows the tested pumped voltage and external gate voltage with different $C_p$ values, which corresponds to FIG. 8. When $C_p$ is 370 pF, $v_p$ decreases relatively quickly while ($v_{gse}+V_n$) rises slowly, resulting in higher switching loss. When $C_p$ is 3.4 nF, the final static gate-source voltage is 21 V, which exceeds the gate voltage rating of the tested SiC MOSFET (19 V). When $C_p$ is 1.8 nF, however, the final static voltage is the same as $V_{dr}$, and the gate voltage rises much more rapidly than $V_{dr}$. The capacitance value is slightly higher than the calculation result (1.7 nF) mainly because the calculation neglects the energy loss during the charge transfer. Generally, the testing result can match well with the analysis in FIG. 8 as well as Equation 7.

Figure 12:
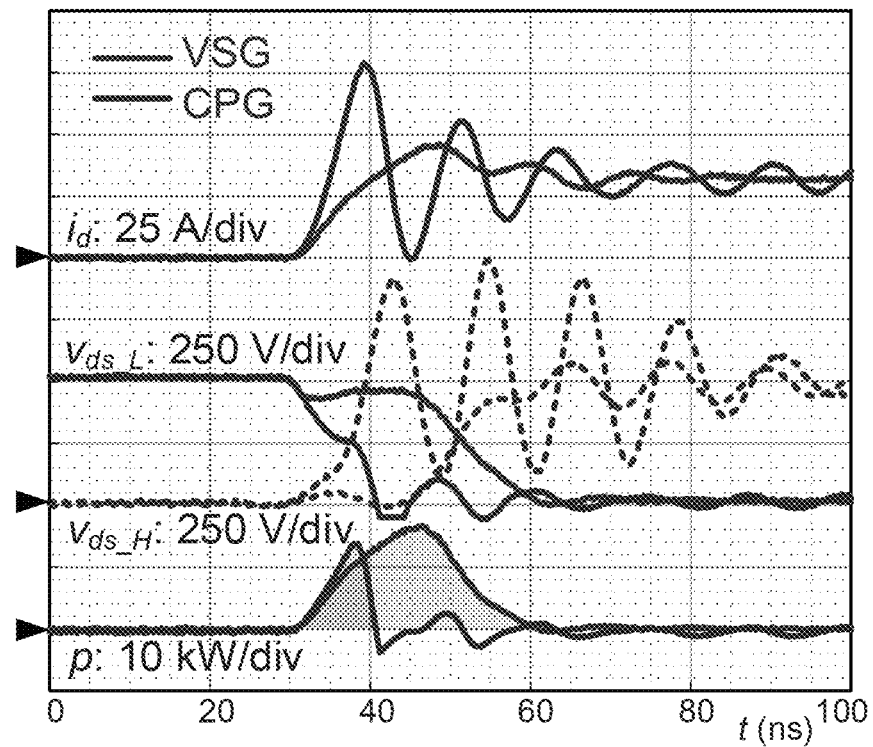
FIG. 12 is a comparison of turn-on transient waveforms for a SiC MOSFET when a charge pump gate drive circuit is used to drive the gate and when a voltage source gate drive circuit is used to drive the gate.

The tested turn-on switching transient waveforms of the drain-source voltage of lower (active) and upper (synchronous) devices, drain current of lower device and instantaneous power with the two gate drives at 500 V voltage and 30 A load current condition is illustrated in FIG. 12. The applied gate resistance is zero. As can be seen in FIG. 12, both the current rise time and voltage fall time are greatly reduced, which indicates much faster switching speed with the CPG circuit 400 according to some embodiments of the inventive concept. The shaded area of the instantaneous power suggests that the turn-on switching loss is also significantly decreased.

Figure 13:
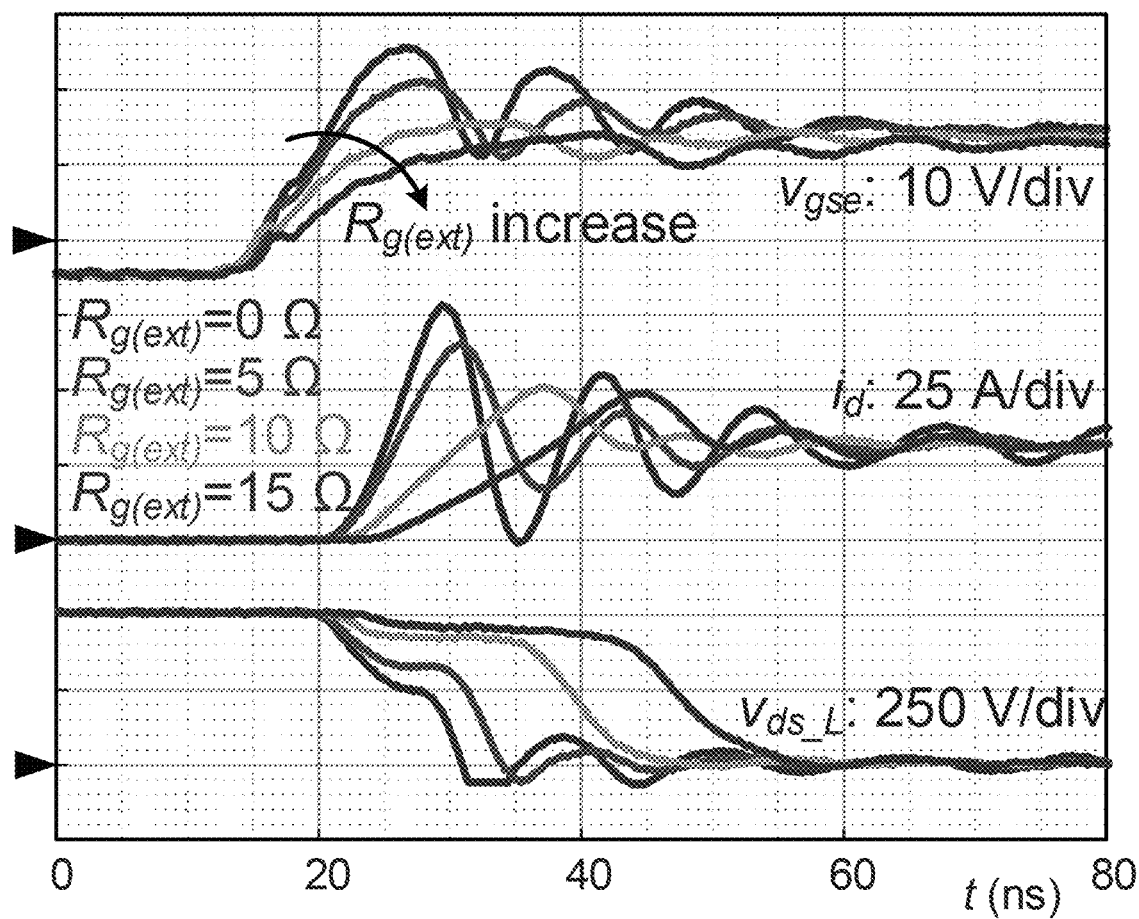
FIG. 13 is a comparison of turn-on transient waveforms for a SiC MOSFET with different gate resistance values.

FIG. 13 illustrates the transient waveforms of the CPG circuit 400 with different external gate resistances according to some embodiments of the inventive concept. By increasing the resistance, the switching speed is slowed like a conventional VSG circuit.

Figure 14:
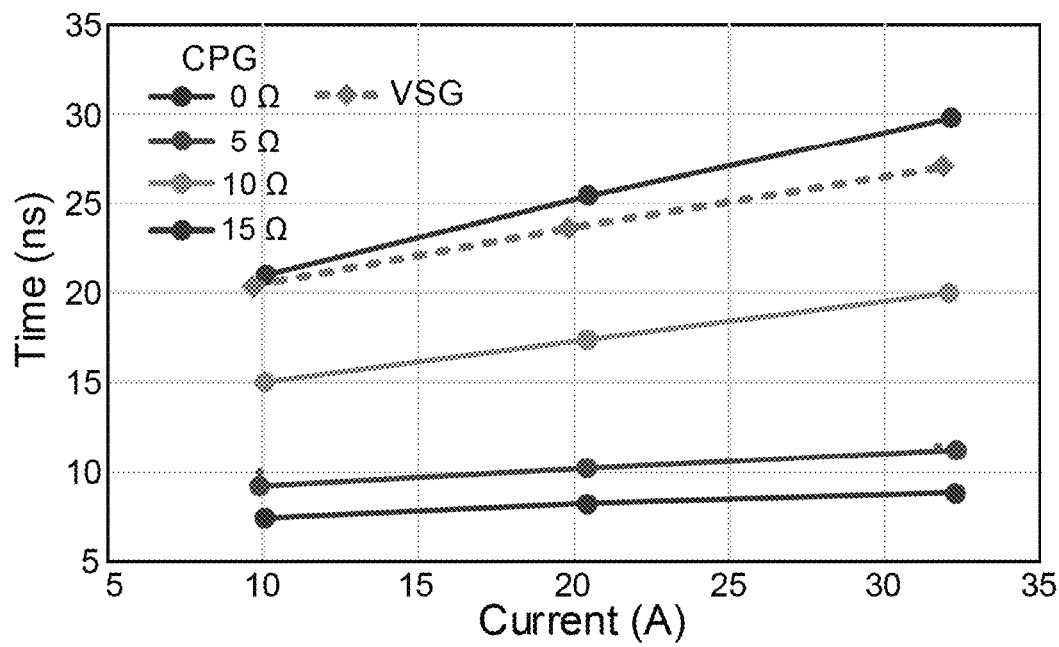
FIG. 14 is a graph that illustrates turn-on switching times for a SiC MOSFET under different loads.
Figure 15:
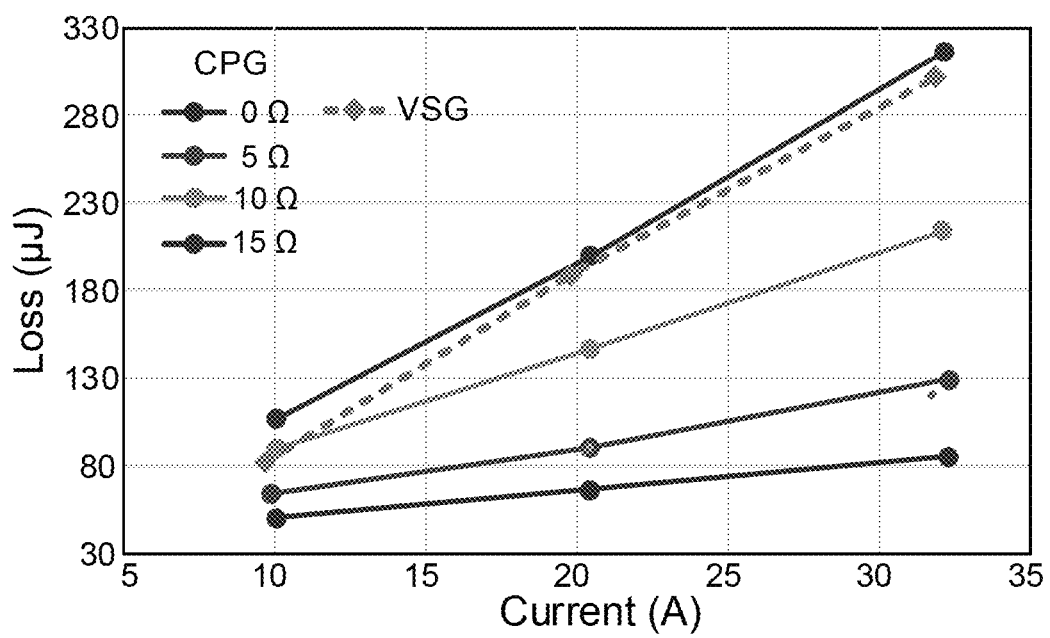
FIG. 15 is a graph that illustrates turn-on switching loss for a SiC MOSFET under different loads.

Nevertheless, the resonance of the drain-source voltage of the synchronous switch becomes more severe, and the peak voltage increases from 606 V to 721 V with the CPG circuit 400 according to some embodiments of the inventive concept. As described above, this may be due to the parasitic influence resulting from a higher dv/dt with a faster switching speed. However, the peak voltage is lower than the breakdown voltage of the SiC MOSFET. FIG. 14 and FIG. 15 show the turn-on switching time and the switching loss with the two gate drives under different load conditions, respectively. With zero $R_{g(ext)}$, the CPG circuit 400 according to some embodiments of the inventive concept can achieve a 67.4% reduction in turn-on switching time compared with a conventional VSG circuit. As the external gate resistance increases, the switching time of the CPG circuit 400 increases. Nevertheless, until $R_{g(ext)}$ reaches 15Ω, the turn-on time of the CPG is lower than the VSG with zero $R_{g(ext)}$. The turn-on loss exhibits a similar trend. At full load and with zero $R_{g(ext)}$, the CPG circuit 400 according to some embodiments of the inventive concept has 71.7% reduction in turn-on loss compared with the conventional VSG circuit.

However, there may be considerations when using the CPG circuit 400, according to some embodiments of the inventive concept, in various applications. As can be observed from FIG. 12, the turn-on drain-source overvoltage across the upper devices (synchronous switch) is significantly increased because of the high switching speed. In hard switching applications, there is always a trade-off between higher switching speed and the side effects resulting from parasitics. Because the overvoltage is highly dependent on the loop design, DC bus voltage, and power level, a designer may select the proper gate resistance based on the application to improve the switching performance and reliability of the device operation, which is similar to a conventional VSG circuit implementation.

Embodiments of the inventive concept may provide a charge pump gate drive (CPG) circuit that can improve the turn-on switching loss for SiC MOSFETs. Compared to a conventional voltage source gate drive (VSG) circuit, the CPG circuit, according to some embodiments of the inventive concept may increase the dynamic gate drive output voltage during the turn-on switching transient. With proper capacitance selection for the charge-storage capacitor, the increased gate drive voltage can automatically drop back to its normal value, which keeps the device turn-on in steady state and avoids overcharging the MOSFET gate. The control of the CPG circuit according to some embodiments of the inventive concept may be embodied via a low-complexity implementation embedded in an integrated circuit. Experiments have been conducted to compare the performance of the CPG circuit according to some embodiments of the inventive concept with a conventional VSG circuit. From the results, the turn-on loss of the CPG circuit according to some embodiments of the inventive concept is reduced by 71.7%, while the switching time is reduced by 67.4% at full load condition relative to the conventional VSG circuit.

Further Definitions and Embodiments:

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the drawings and specification, there have been disclosed typical embodiments of the inventive subject matter, and, although specific terms are used, they are used in a generic and descriptive sense only and not for purposes of limitation, the scope of the invention being set forth in the following claims.

That which is claimed:

1. An electronic circuit, comprising:
a charge pump circuit comprising:
   a drive power supply;
   a flying capacitor; and
   a pump capacitor that is coupled in parallel to the drive power supply and the flying capacitor in response to a first control signal being in first state and is configured to receive charge from the flying capacitor to boost a pump voltage across the pump capacitor to a value that exceeds a drive voltage provided by the drive power supply responsive to a transition of the first control signal from the first state to a second state;
   a first totem pole circuit comprising a first pair of MOSFETs coupled to one another, the first totem pole circuit being coupled in parallel to the drive power supply;
   wherein the first totem circuit is responsive to the first control signal; and
a gate drive circuit coupled to the charge pump circuit, wherein the gate drive circuit comprises:
   a second totem pole circuit comprising a second pair of MOSFETS coupled to one another at an output terminal, the second totem pole circuit being coupled in parallel to the pump capacitor;
   wherein the second totem pole circuit is configured to couple the pump voltage of the pump capacitor to the output terminal responsive to a transition of a second control signal from the first state to the second state; and
a control signal generation circuit that is configured to generate the first control signal and the second control signal such that the transition of the second control signal from the first state to the second state is delayed relative to the transition of the first control signal from the first state to the second state.

2. The electronic circuit of claim 1, wherein the control signal generation circuit comprises:
   a first delay module;
   logic circuitry coupled to the first delay module and configured to generate the first control signal responsive to an input signal and a delayed version of the input signal output from the first delay module; and
   a second delay module that is configured to generate the second control signal responsive to the input signal.

3. The electronic circuit of claim 2, wherein the first delay module comprises at least one first RC filter and the second delay module comprises at least one second RC filter.

4. The electronic circuit of claim 1, wherein the pump voltage across the pump capacitor asymptotically approaches the drive voltage provided by the drive power supply responsive to the transition of the second control signal from the first state to the second state.

5. The electronic circuit of claim 1, wherein a capacitance $C_p$ of the pump capacitor is not greater than:

$$\frac{C_{gs}(V_{dr} - V_n) + C_{gd\_Q}V_{dc} + C_{oss}V_{dr}}{V_{dr}}$$

wherein $C_{gs}$ is a capacitance of a gate terminal of an SiC MOSFET that is configured for coupling to the output terminal of the second totem pole circuit, wherein $V_{dr}$ is a voltage provided by the drive power supply, wherein $V_n$ is a voltage applied across the gate terminal and a source terminal of the SiC MOSFET, wherein $C_{gd\_Q}$ is a charge equivalent transfer capacitance of the SiC MOSFET at $V_{dc}$, wherein $V_{dc}$ is a DC bus voltage for the SiC MOSFET, and wherein $C_{oss}$ is an output capacitance of one of the MOSFETS of the second totem pole circuit.

6. The electronic circuit of claim 5, further comprising:
a bias power supply that is configured to provide a negative voltage across the gate terminal and the source terminal of the SiC MOSFET while the SiC MOSFET is turned off.

7. The electronic circuit of claim 1, wherein a capacitance $C_f$ of the flying capacitor is about 50 times greater than a capacitance $C_p$ of the pump capacitor.

8. The electronic circuit of claim 1, wherein the flying capacitor has a capacitance of about 100 nF and the pump capacitor has a capacitance of about 1.8 nF.

9. The electronic circuit of claim 1, wherein the gate drive circuit is configured as a voltage source gate drive circuit.

10. An electronic circuit, comprising:
a charge pump circuit comprising:
a drive power supply;
a flying capacitor; and
a pump capacitor that is coupled in parallel to the drive power supply and the flying capacitor in response to a first control signal being in first state and is configured to receive charge from the flying capacitor to boost a pump voltage across the pump capacitor to a value that exceeds a drive voltage provided by the drive power supply responsive to a transition of the first control signal from the first state to a second state;
a first totem pole circuit comprising a first pair of MOSFETs coupled to one another, the first totem pole circuit being coupled in parallel to the drive power supply;
wherein the first totem circuit is responsive to the first control signal; and
a gate drive circuit coupled to the charge pump circuit, wherein the gate drive circuit comprises:
a second totem pole circuit comprising a second pair of MOSFETS coupled to one another at an output terminal, the second totem pole circuit being coupled in parallel to the pump capacitor;
wherein the second totem pole circuit is configured to couple the pump voltage of the pump capacitor to the output terminal responsive to a transition of a second control signal from the first state to the second state; and
wherein the pump voltage across the pump capacitor asymptotically approaches the drive voltage provided by the drive power supply responsive to the transition of the second control signal from the first state to the second state.

11. The electronic circuit of claim 10, wherein the charge pump circuit further comprises:
a first totem pole circuit comprising a first pair of MOSFETs coupled to one another, the first totem pole circuit being coupled in parallel to the drive power supply;
wherein the first totem circuit is responsive to the first control signal.

12. The electronic circuit of claim 11, wherein the gate drive circuit comprises:
a second totem pole circuit comprising a second pair of MOSFETS coupled to one another at an output terminal, the second totem pole circuit being coupled in parallel to the pump capacitor.

13. The electronic circuit of claim 12, wherein the second totem pole circuit is configured to couple the pump voltage of the pump capacitor to the output terminal responsive to a transition of a second control signal from the first state to the second state.

14. An electronic circuit, comprising:
a charge pump circuit comprising:
a drive power supply;
a flying capacitor; and
a pump capacitor that is coupled in parallel to the drive power supply and the flying capacitor in response to a first control signal being in first state and is configured to receive charge from the flying capacitor to boost a pump voltage across the pump capacitor to a value that exceeds a drive voltage provided by the drive power supply responsive to a transition of the first control signal from the first state to a second state; and
a gate drive circuit coupled to the charge pump circuit;
wherein a capacitance $C_f$ of the flying capacitor is about 50 times greater than a capacitance $C_p$ of the pump capacitor.

15. The electronic circuit of claim 14, wherein the charge pump circuit further comprises:
a first totem pole circuit comprising a first pair of MOSFETs coupled to one another, the first totem pole circuit being coupled in parallel to the drive power supply;
wherein the first totem circuit is responsive to the first control signal.

16. The electronic circuit of claim 15, wherein the gate drive circuit comprises:
a second totem pole circuit comprising a second pair of MOSFETS coupled to one another at an output terminal, the second totem pole circuit being coupled in parallel to the pump capacitor.

17. The electronic circuit of claim 16, wherein the second totem pole circuit is configured to couple the pump voltage of the pump capacitor to the output terminal responsive to a transition of a second control signal from the first state to the second state.

\* \* \* \* \*